Dec. 11, 1951 L. McGIHON 2,578,012
VARIABLE DRIVE TRANSMISSION
Filed March 3, 1947 4 Sheets-Sheet 1
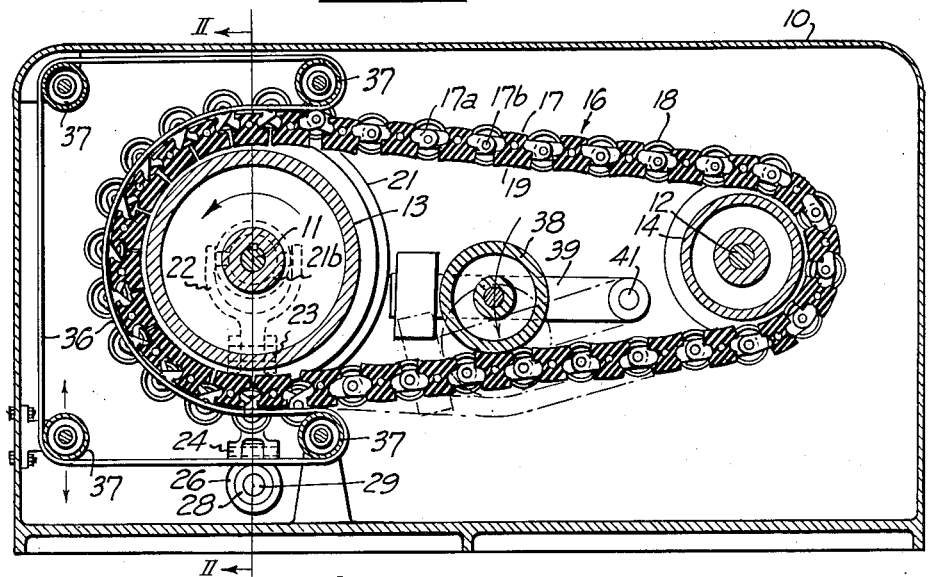
Fig.1
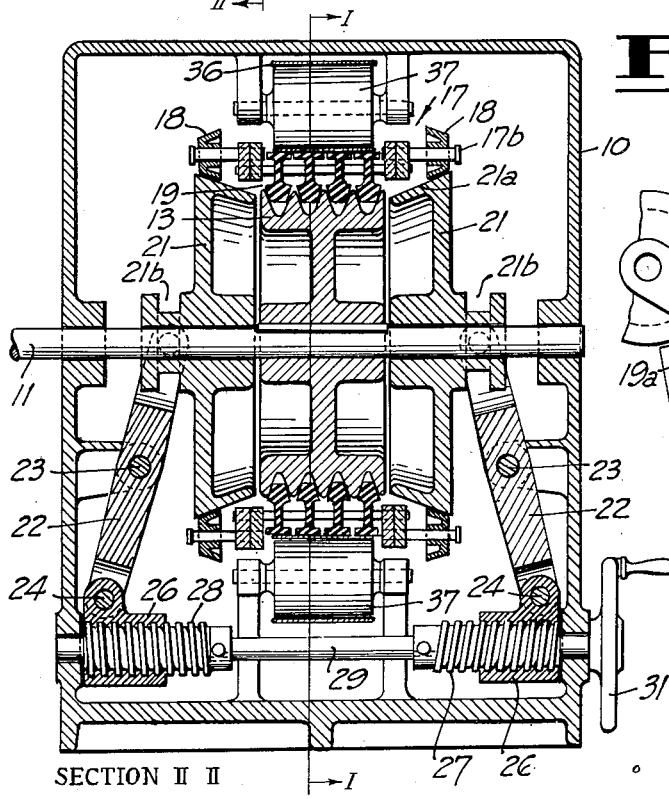
SECTION II II
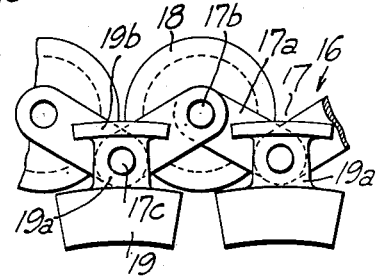
Fig.2
Fig.3
LEONARD McGIHON
INVENTOR
By Harper Allen
ATTORNEY LEONARD McGIHON
INVENTOR

BY

ATTORNEY

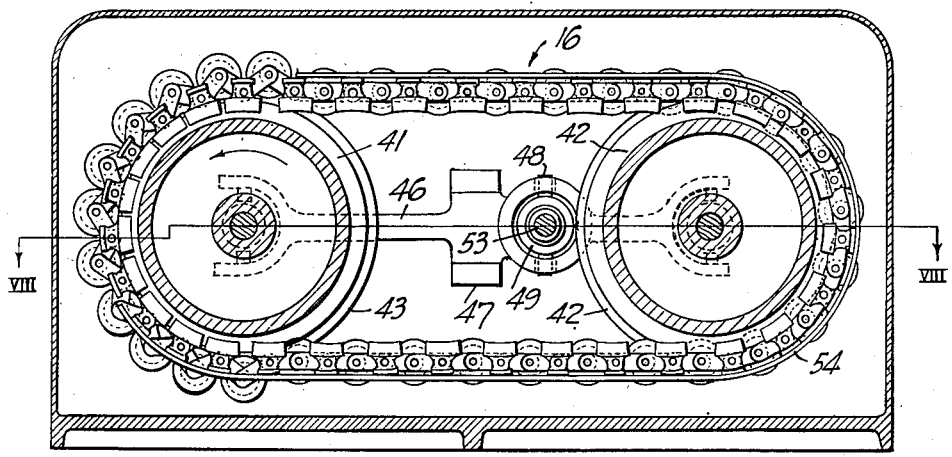
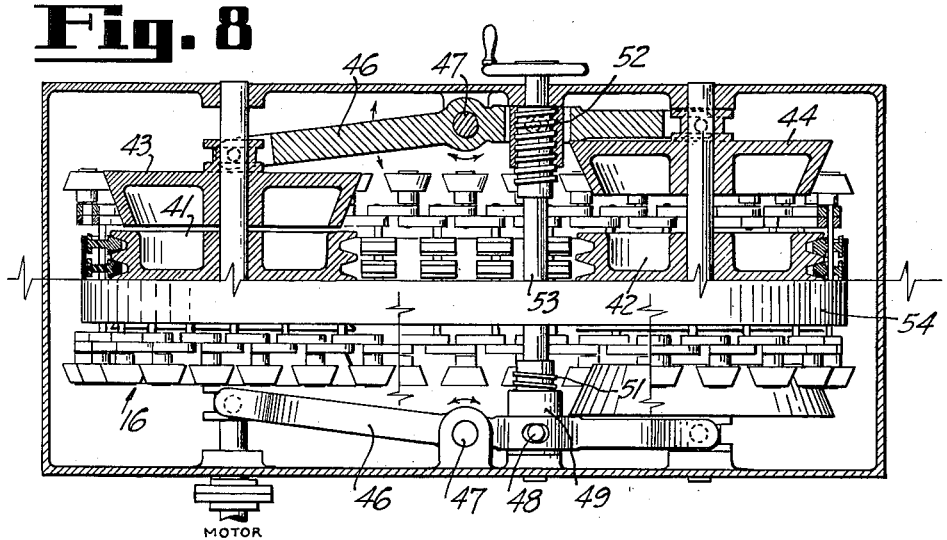
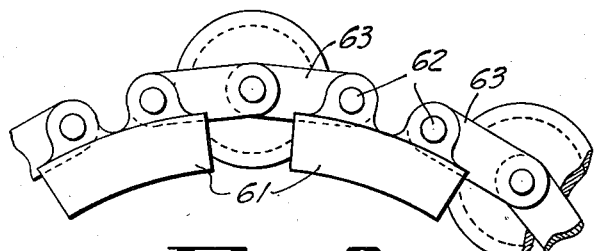

Dec. 11, 1951     L. McGIHON     2,578,012
VARIABLE DRIVE TRANSMISSION
Filed March 3, 1947     4 Sheets-Sheet 4

LEONARD McGIHON
INVENTOR
BY Harper Allen
ATTORNEY

Patented Dec. 11, 1951

2,578,012

UNITED STATES PATENT OFFICE 2,578,012

VARIABLE DRIVE TRANSMISSION

Leonard McGihon, San Leandro, Calif., assignor to King Sales & Engineering Co., San Francisco, Calif., a corporation of California Application March 3, 1947, Serial No. 731,964

12 Claims. (Cl. 74—217)

This invention relates to variable drive mechanisms and is concerned more particularly with an improved mechanism of this character which provides for a variable speed ratio between a source of power such as an electric motor and a driven mechanism.

It is a general object of the invention to provide an improved variable drive mechanism in which selected basic speed ratios can be employed and with respect to which the drive can be variable through a selected speed range.

Another object of the invention is to provide a variable drive mechanism of the above character which occupies a small space and which provides a large amount of drive transmitting surface engagement for the given space.

Another object of the invention is to provide a variable drive transmission which can employ conventional V-belt pulleys as the driving and driven members together with an adjustable drive transmitting element extending therebetween.

A further object of the invention is to provide a variable drive mechanism in which the variation of the drive is controlled by wrapping variable amounts of a flexible drive transmitting element around the driving or driven pulley of the mechanism.

The above and other objects of the invention will be apparent from the following description of a certain preferred embodiment thereof as illustrated in the accompanying drawings, in which:

Figure 1 is a longitudinal sectional view through a drive mechanism embodying the invention, the view being indicated by the line I—I in Figure 2.

Figure 2 is a transverse sectional view of the mechanism as indicated by the line II—II in Figure 1.

Figure 3 is a fragmentary elevational view of a portion of one of the flexible drive members.

Figure 7 is a sectional elevational view of a modified form of the drive mechanism in which both the driven and driving pulley mechanism have associated therewith adjusting means for controlling the length of the drive transmitting element to be wrapped thereabout.

Figure 8 is a horizontal sectional view of the mechanism shown in Figure 7, taken as indicated by the line VIII—VIII therein.

Figure 9 is an elevational view of a modified form of drive transmitting element.

Figure 10:
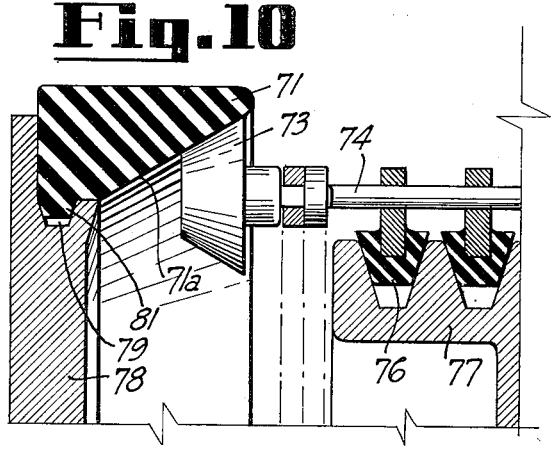
Figure 11:
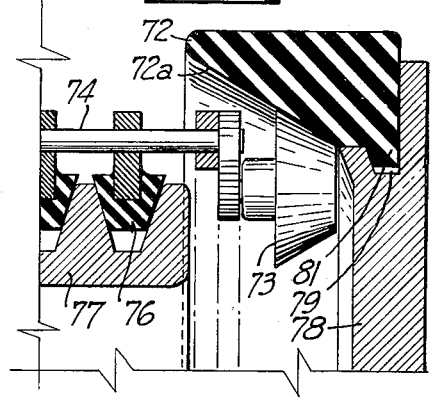
Figure 12:
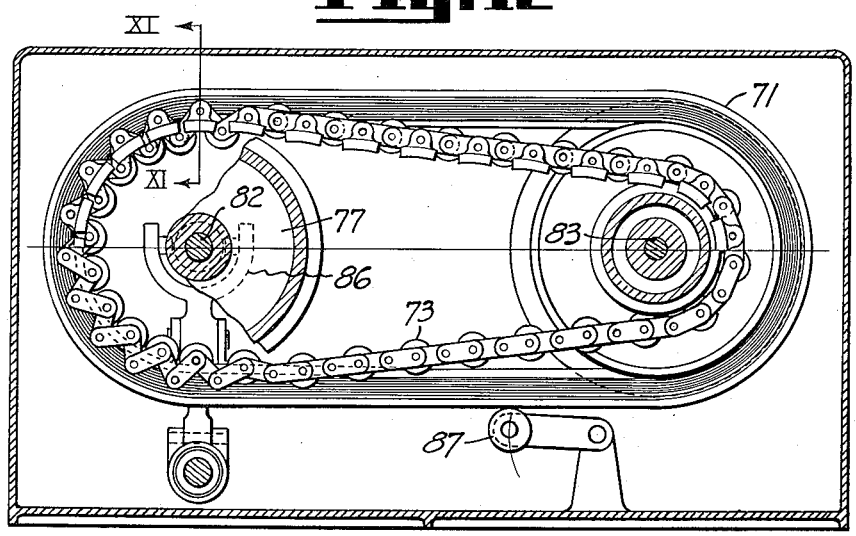

Figures 10 and 11 together show transverse sectional views through a modified form of the variable drive mechanisms, the plane of the views being indicated by the line XI—XI in Figure 12.

Figure 12 is a sectional elevational view of the form of drive mechanism shown in Figures 10 and 11.

Figure 13:
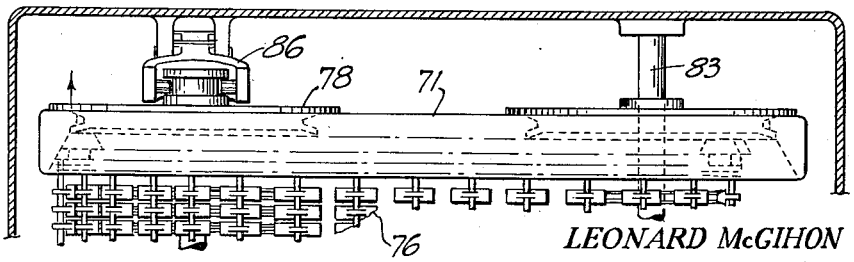

Figure 13 is a fragmentary plan view of the mechanism shown in Figures 10 through 12.

Referring first to Figures 1 through 5, the variable drive mechanism includes a housing 10 of any suitable construction in which respective driving and driven shafts 11 and 12 are journalled. The driving shaft 11 (Figures 1 and 2) has keyed thereon a multiple groove V-belt pulley 13 which in the present instance is shown as having four annular grooves of the usual form. The driven shaft 12 carries a similar multiple pulley 14 which, as shown, is one-half the diameter of the pulley 13 so that a two to one driving relationship between these two pulleys forms a basic speed ratio of the drive mechanism.

Associated with the respective driving and driven pulleys is an articulated drive connecting means trained thereabout indicated generally at 16 which is composed of a pair of chains carrying therebetween a corresponding series of V-belt segments or drive sections for cooperation with the pulleys 13 and 14. In the present instance each of the respective chains 17 (Figures 3 and 5) includes a series of articulated links 17a of conventional construction which have associated therewith hinge pins of special construction. One set of alternately arranged hinge pins 17b extend outwardly with respect to each of the chains 17, as seen in Figure 2, and each pin 17b has secured thereon a conical control element 18. The other alternate series of hinge pins 17c are common to the two chains 17 and intermediate these chains carry a series of V-belt segments 19. The segments 19 may be formed of rubber, either natural or synthetic, or a rubber fabric of the type commonly employed for V-belts, and the segments are molded about a journal or support portion 19a having an upper arcuate belt bearing portion 19b provided for a purpose later referred to.

Figure 4:
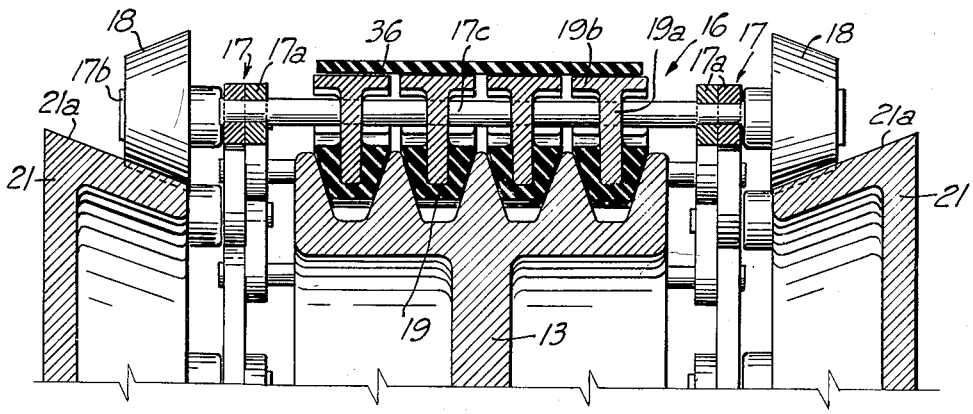
Figure 4 is an enlarged view of the upper portion of Figure 2.
Figure 5:
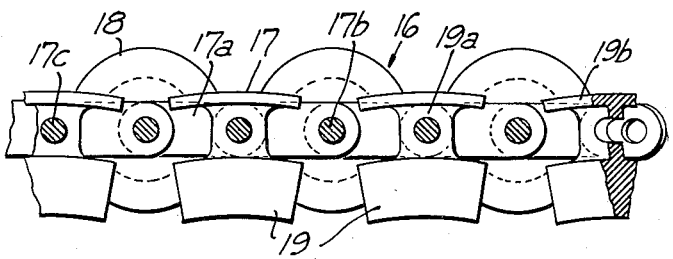
Figure 5 is an elevational sectional view of the drive connection in an unflexed or straight condition.

From the above description it will be seen that the drive connection 16 by virtue of the drive transmitting segments 19b provides the drive characteristics of a V-belt while by virtue of the supporting chain construction the drive connection is articulated so that relative flexing can occur between adjacent links of the chain, as shown, for example, in Figures 1 and 3. The straight or unflexed condition of the drive connection is shown in Figure 5.

In order to vary the speed ratio of the drive in selected limits with respect to the pre-selected basic drive ratio, the drive connection can be selectively articulated as it feeds onto the driving pulley 13 so that a greater length of the drive connection can be wrapped around this drive pulley and in effect increase the speed drive of the driven pulley 14 where the links are trained about in unflexed or straight relation. In order to accomplish this control, the control cones 18 which are disposed on alternate hinged joints of the respective chains are adapted to cooperate with respective opposite control cam wheels 21 having conical control surfaces 21a. The control wheels 21 are journalled freely on the driving shaft 11 and are provided with grooved collars 21b which are engaged by the forked ends of respective control forks 22 respectively pivoted at 23 within the casing 10. The lower end of each control fork 22 is pivoted at 24 to an internally threaded control sleeve 26. The respective sleeves 26 engage respectively with control worms 27 and 28 secured on a control shaft 29 having an operating handle 31 thereon. The respective worms 27 and 28 are threaded oppositely so that rotation of the shaft 29 and the worms 27 and 28 will effect simultaneous in and out movement of both of the control wheels 21. The wheels 21 are shown in their innermost positions in Figures 2 and 4 so that the alternate hinge joints 17b about the driving element 13 occupy their maximum radially displaced positions, and the greatest effective length of the drive connection is wrapped about the drive pulley.

In order to maintain the proper driving relationship of the drive segments 19b with the driving pulley 13, a hug belt 36 is provided which is trained about four idler rollers 37 suitably mounted in the casing 10 so that the hug belt encompasses approximately one-half of the pulley 13 and engages the sections 19b of the drive transmitting segments so that the segments 19 are maintained in the desired driving relation with the pulley 13.

For accommodating the varying length of the drive connection 16 in different conditions of adjustment, a suitable form of slack take-up means may be provided, for example, the roller 38 journalled on a weighted arm 39 pivoted at 41 on the casing 10. If preferred, a spring-urged roller 38 may be employed instead of a weighted roller.

As shown in Figures 1 and 2, the control elements or cones 21 are disposed in their maximum inwardly adjusted position so that the portion of the chain drive element in engagement with the driving pulleys 13 has its links flexed to the maximum so that a maximum amount of this element is wrapped about the drive pulley in performing the drive and the highest speed of operation of the driven pulley 14 is obtained. It will be noted that, as each successive aligned pair of control cones 18 on the drive connection engage the cooperating control wheels 21, they are moved radially outwardly with respect to the pulley 13 while the drive transmitting segments 19 on the other alternate series of hinged joints of the chains pass beneath the hug belt 36. Correspondingly, when the control cones 18 leave the control cones 21, the links of the chains are straightened so that the overall lengths of the drive connection for a given setting is not variable. Thus, by appropriate adjustment of the axial position of the control cones 21 with respect to the drive connection the speed ratio of the drive can be varied. Assuming that the maximum selected adjustment or angularity of the links when flexed is at 45°, the effective increase in length of the chain wrapped about the driving pulley is in the ratio of two to the square root of two. This is equivalent of changing the diameter of the pulley 13 by the same ratio in so far as its effect on the speed ratio of the drive is concerned.

Figure 6:
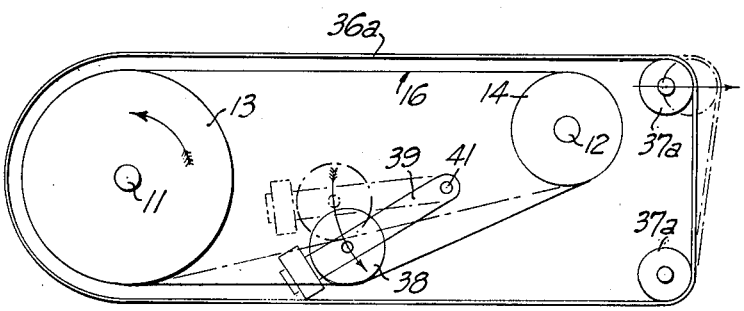
Figure 6 is a diagrammatic view illustrating a modified construction of the drive transmission.

In the form of the invention shown in Figure 6 the hug belt 36a is trained directly around the drive transmitting element 16 and about a pair of idler rollers 37a disposed to the right of the driven pulley 14 so that the hug belt encompasses the entire drive mechanism. If desired, one of the rollers 37a may be made adjustable to compensate for stretch in the belt 36a.

In the form of the invention shown in Figures 7 and 8, both of the driving and driven pulleys 41 and 42 have associated therewith the respective pairs of adjusting cone wheels 43 and 44 which are reversely adjustable with respect to each other by means of a pair of double end control forks 46 respectively pivoted at 47. Each of the forks 46 is apertured adjacent its pivot point to receive opposite pivot trunnions 48 of an adjusting nut 49 so that the angular position of the control forks 46 can be varied by means of the oppositely threaded worms 51 and 52 on the control shaft 53. In this instance the hug belt 54 is trained directly about the drive transmitting connection 16. As shown, the two driving and driven pulleys 41 and 42 are of the same diameter, but if a different diameter is desired then the hug belt 54 would have associated therewith a suitable form of take-up roller similar to that shown at 38 in Figure 1.

From the above description it will be seen that by adjustment of the control forks 46 and the respective sets of control elements or cone wheels 43 and 44, the amount of chain wrapped about the respective driving and driven pulleys 41 and 42 can be simultaneously varied.

Figure 9 shows a modified form of drive transmitting element in which the drive transmitting segments 61 (similar to the segments 19) are connected adjacent each end by respective pivot pins 62 to the adjacent chain links 63 so that as tension is applied to the drive connection the flexible drive segment 61 tends to curve to fit the circumference of the driving pulley with which it is engaged.

Figures 10 through 13 illustrate a modified form of drive transmission in which the control member for effecting the flexing adjustment of the drive chain is provided in the form of respective endless cam belts 71 and 72, provided with inclined inner cam surfaces 71a and 72a, respectively, for cooperation with the control cones or rollers 73 carried on alternate pivot pins 74 of the drive chain. With this form of the invention the effective wrapping of a greater length of the chain about the pulley is effected by an exterior control with respect to the control cones 73 on the drive transmitting chain, and the forces exerted in effecting this control also tend to keep the drive transmitting segments 76 engaged with the drive pulley 77. The respective belts 71 and 72 are trained about respective pulleys 78, each having an annular groove 79 to receive a rib 81 of the cooperating belt. There are pulleys 78 on both of the driving and driven shafts 82 and 83 of the drive mechanism. The pulleys 78 on the driving shaft 82 are adjustable inwardly and outwardly by respective control forks 86 in the manner previously described, while the pulleys 78 on the driven shaft 83 are freely journalled thereon and can slide axially under the axial thrust transmitted by the associated belt 71 or 72. If desired, each of the belts 71 and 72 may have a suitable spring-urged take-up roller 87 associated therewith.

In connection with the operation of the various modifications disclosed herein, it will be noted that each of them incorporates a flexible or articulated drive belt operating in conjunction with pulleys of fixed diameter, and that the change in speed of the driven member, for example pulley 14 in Figure 1, is effected by wrapping more or less length of the drive connection or belt about the pulley in a given unit of time. The length of belt wrapped around the pulley 14 in a given unit of time is controlled by the flexing or zigzag positioning of the belt in travelling about the driving pulley 13. The cone-shaped control wheels 21 (Figure 2) serve to lift alternate pivotal connections of the links of the belt (see Figure 3) to place more length of belt about the pulley 13 in a given length of time than with the belt unflexed. This operation gives the same result with respect to the driven pulley 14 (increase in speed) as if the diameter of the pulley 13 had been increased.

While I have shown certain preferred embodiments of the invention, it will be understood that the invention is capable of variation and modification from the form shown so that its scope should be limited only by the scope of the claims appended hereto.

I claim:

1. A variable drive mechanism including respective drive and driven members of constant pitch diameter, an articulated drive element trained about said members having drive segments at a series of the points of articulation thereof and having control elements at another series of the points of articulation thereof, and control means for displacing said control elements radially of one of said members to effect zigzag flexing of the element as it travels about said one member to vary the speed ratio of the drive.

2. A variable drive mechanism including respective drive and driven members of constant pitch diameter, an articulated drive element trained about said members having drive segments at a series of the points of articulation thereof and having control elements at another series of the points of articulation thereof, control means for displacing said control elements radially of one of said members to effect zigzag flexing of the element as it travels about said one member to vary the speed ratio of the drive, and means for engaging said drive element at said first series of points of articulation to maintain said drive segments engaged with said one member.

3. A variable drive mechanism including respective drive and driven members of constant pitch diameter, and a flexible drive element trained about said members; said drive element comprising a pair of parallel chains, a series of common pivot pins extending between said chains, drive segments carried by said pins for engaging said members, each chain having another series of pivot pins projecting away from the other of the chains, and flexing control elements carried by said another series of pivot pins.

4. A variable drive mechanism including respective drive and driven pulleys of constant pitch diameter, and a flexible drive element trained about said members; said drive element comprising a pair of parallel chains, a series of common pivot pins extending between said chains, V-shaped drive segments carried by said pins for engaging said pulleys, each chain having another series of pivot pins projecting away from the other of the chains, and flexing control elements carried by said another series of pivot pins.

5. A variable drive mechanism including respective drive and driven pulleys of constant pitch diameter, and a flexible drive element trained about said members; said drive element comprising a pair of parallel chains, a series of common pivot pins extending between said chains, a plurality of parallel V-shaped drive segments carried by each of said pins for engaging said pulleys, each chain having another series of pivot pins projecting away from the other of the chains, and flexing control elements carried by said another series of pivot pins.

6. A variable drive mechanism including a drive member, a driven member, an articulated drive connection trained about said members, alternate pivotal connections of said drive connection carrying respective control elements for varying the radial position of the associated pivotal connection with reference to the associated member and the other alternate series of pivotal connections carrying drive elements engaging said members, and axially movable rotatable control means for engaging the control elements as they approach one of said members to cause flexing of the drive connection as it engages one of said members.

7. A variable drive mechanism including a drive member, a driven member, an articulated drive connection trained about said members, a series of pivotal connections of said drive connection carrying respective control elements for varying the radial position of the associated pivotal connection with reference to the associated member and another alternate series of pivotal connections carrying drive elements engaging said members, and adjustable control means for engaging the control elements as they approach one of said members to cause flexing of the drive connection as it engages one of said members.

8. A variable drive mechanism including a drive member, a driven member, a flexible drive connection trained about said members, a series of spaced control elements on said connection for causing flexing of the drive connection with reference to one of said members, and axially movable rotatable control means for engaging the control elements and causing flexing of the drive connection as it engages said one member.

9. A variable drive mechanism including a drive member, a driven member, an articulated drive connection trained about said members, alternate pivotal connections of said drive connection each including a control element for varying the radial position of the associated pivotal connection with reference to the associated member, axially movable control means for engaging the control elements and causing flexing of the drive connection as it engages one of said members, and means engaging the other alternate series of pivotal connections of said drive connection for maintaining the radial position thereof.

10. A variable drive mechanism including a drive member, a driven member, an articulated drive connection trained about said members, a series of the pivotal connections of said drive connection each including a control element for varying the effective length of the drive connection, and control means for engaging the control elements and changing the effective length of the drive connection as it engages one of said members.

11. A drive connection comprising a pair of spaced apart endless support chains, a series of outwardly projecting control elements on each of said chains, and a series of cross elements extending between said chains, each of said cross elements carrying at least one drive transmitting and drive receiving segment.

12. A variable drive mechanism including a drive member, a driven member, a flexible drive connection trained about said members, a series of spaced control elements on said connection for causing flexing of the drive connection with reference to one of said members, and movable control means for engaging the control elements and causing flexing of the drive connection as it engages said one member.

LEONARD McGIHON.

REFERENCES CITED

The following references are of record in the file of this patent:

UNITED STATES PATENTS

| Number | Name | Date |
| --- | --- | --- |
| 1,208,234 | Ternstedt | Dec. 12, 1916 |
| 1,587,756 | Calkins | June 8, 1926 |
| 1,656,628 | Gits | Jan. 17, 1928 |